Patented Feb. 22, 1927.

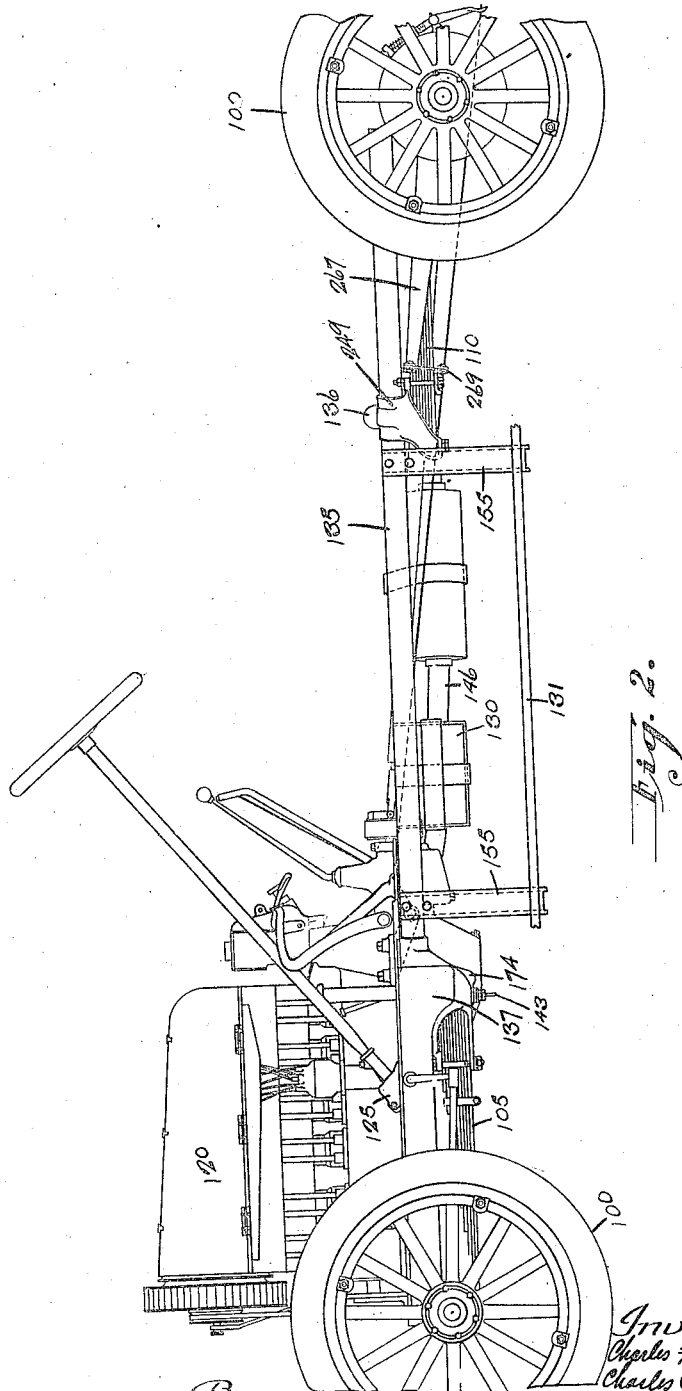

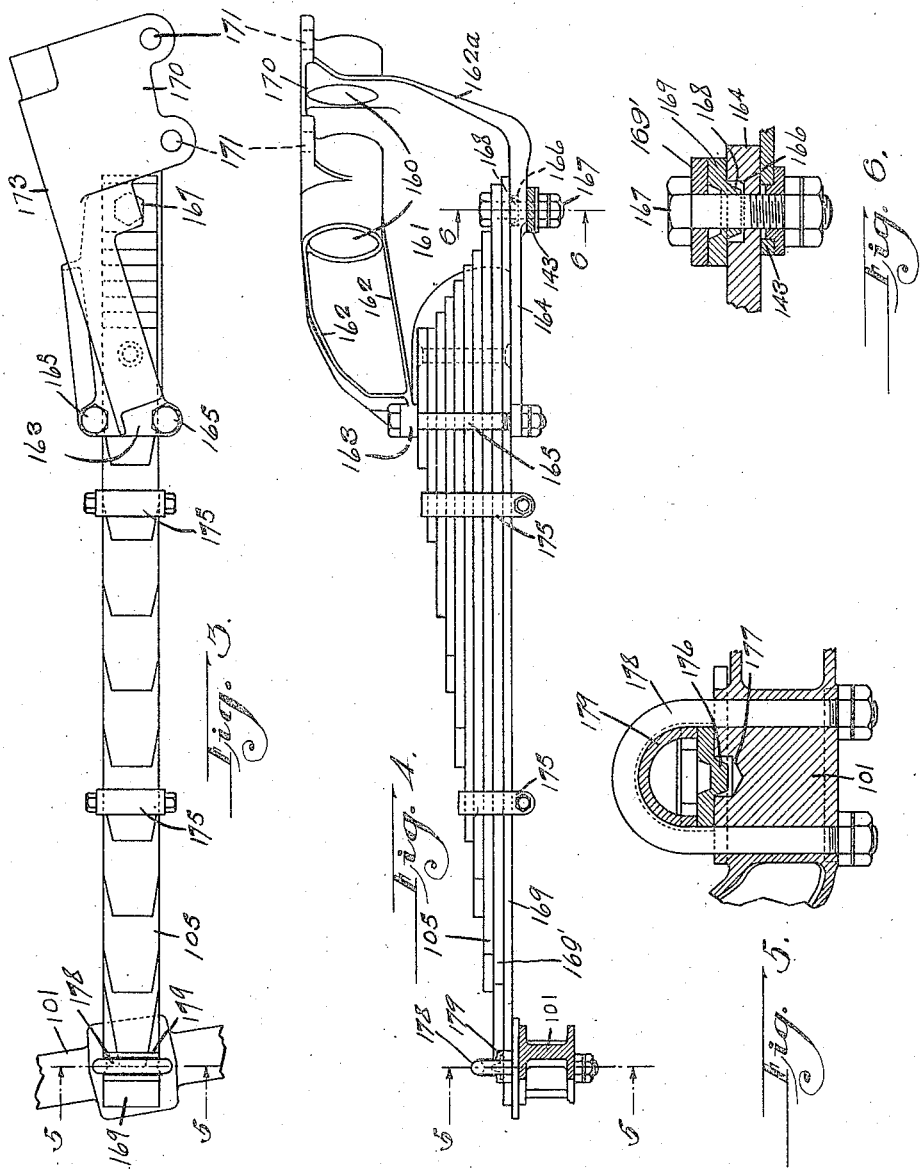

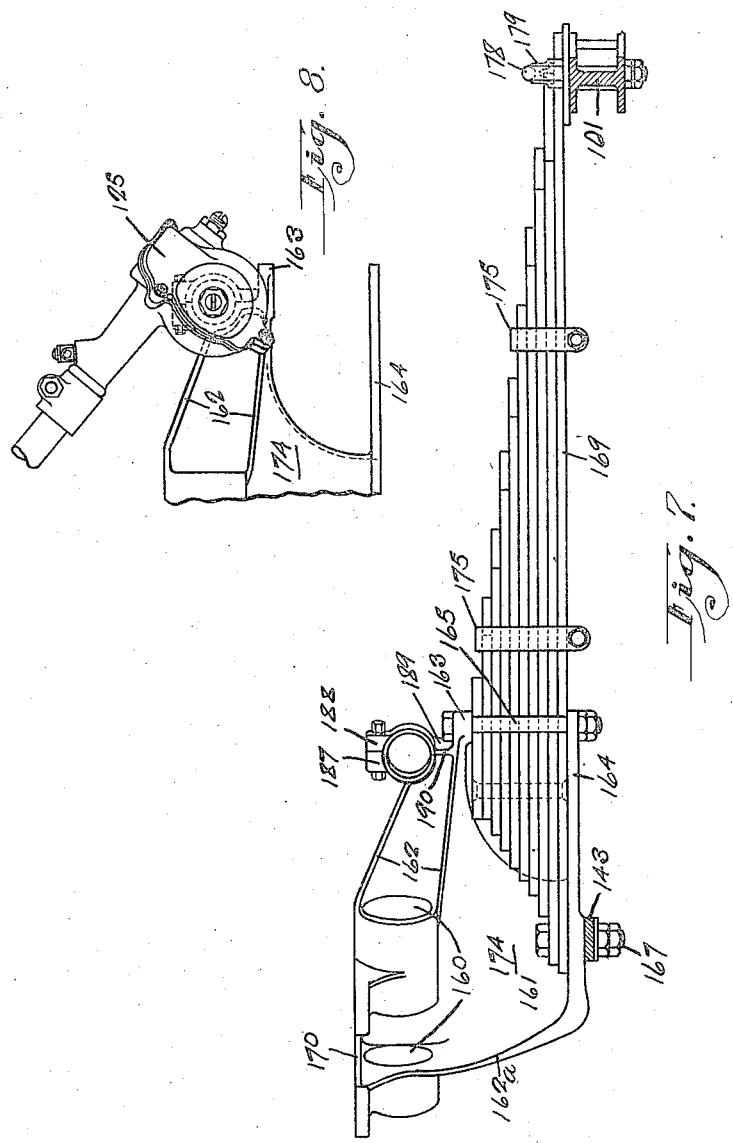

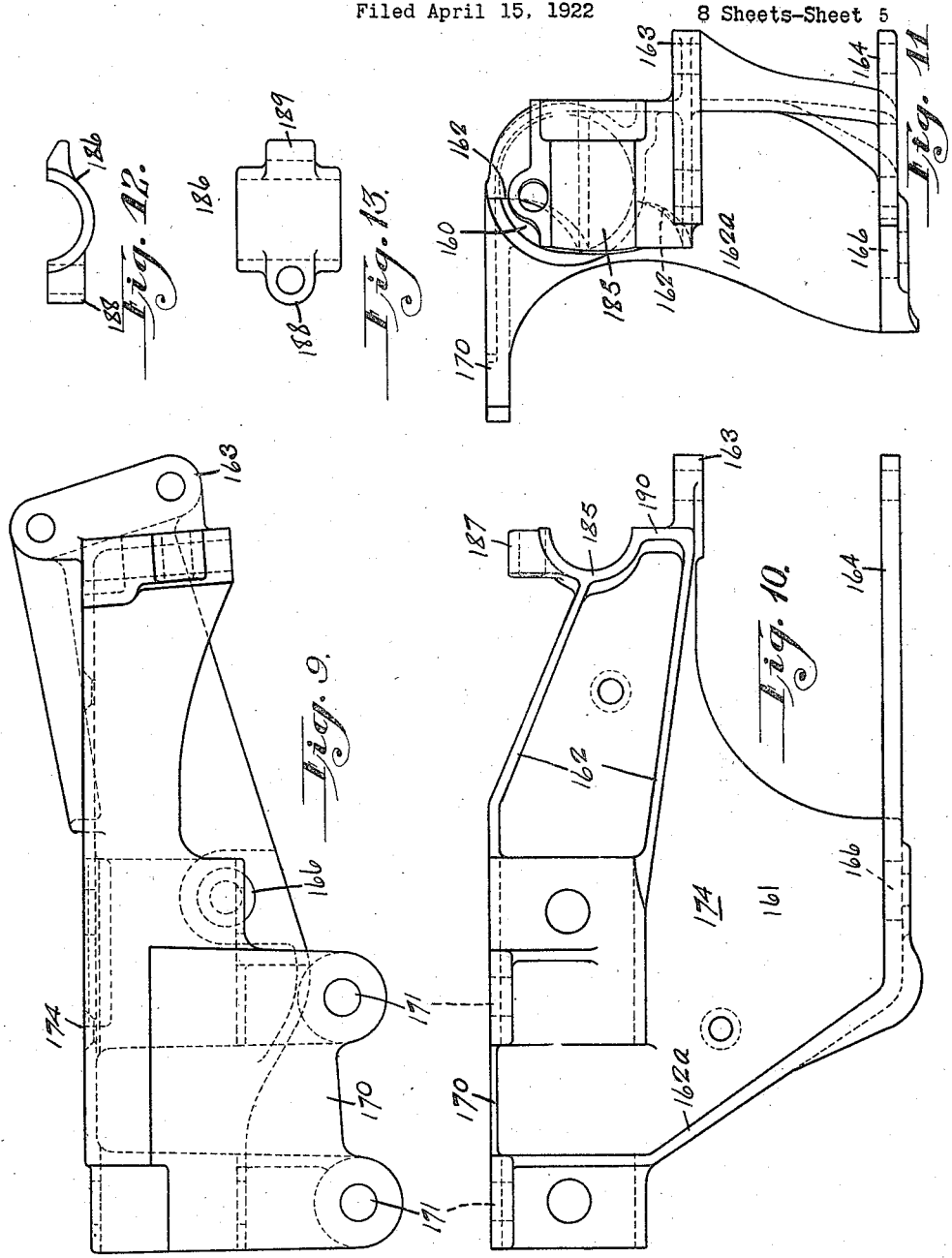

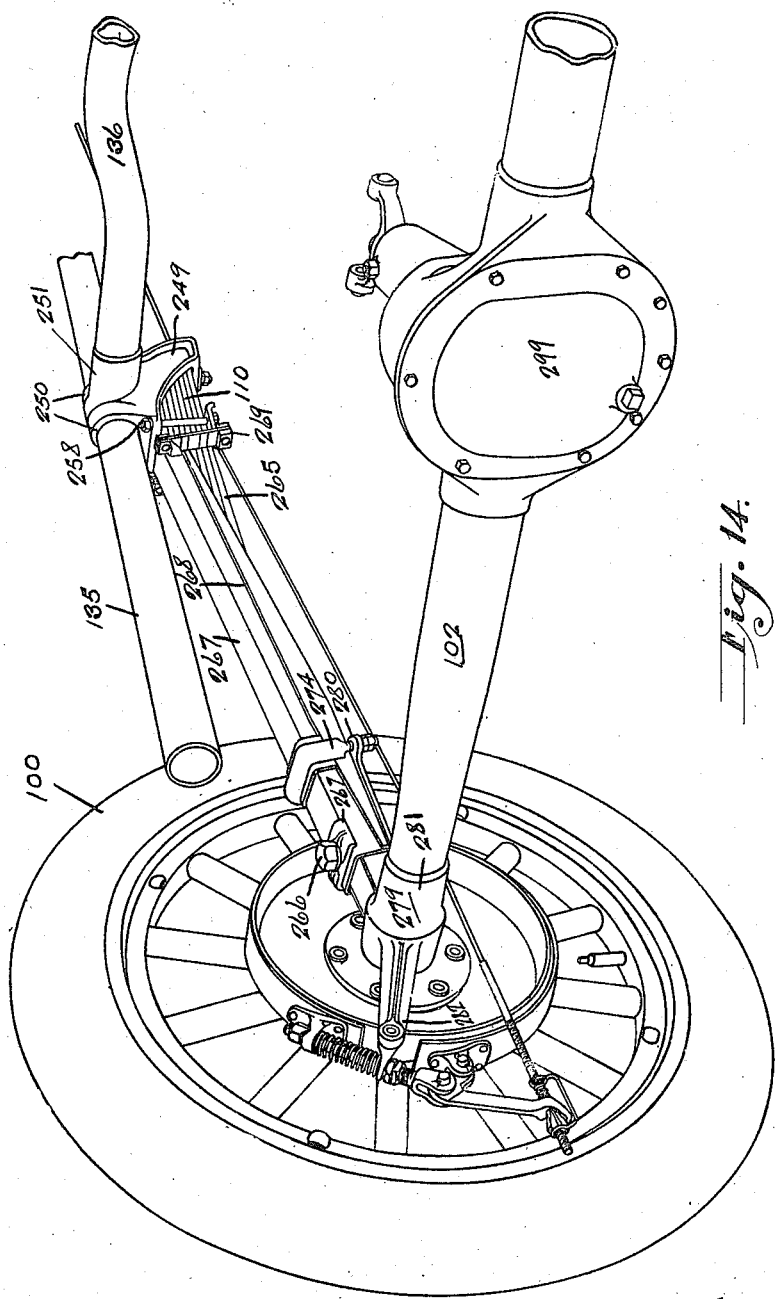

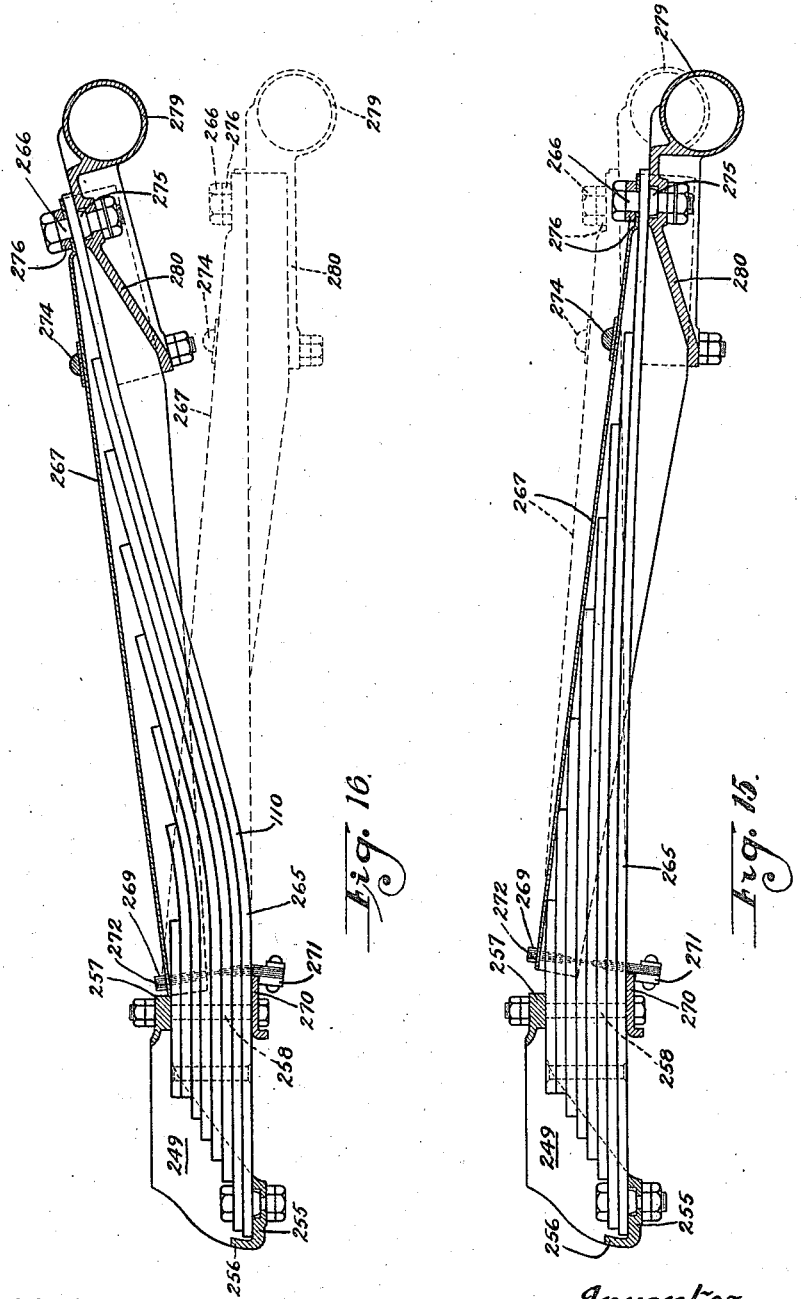

1,618,439

UNITED STATES PATENT OFFICE.

CHARLES F. KETTERING AND CHARLES R. SHORT, OF DAYTON, OHIO, ASSIGNORS TO GENERAL MOTORS RESEARCH CORPORATION, OF DAYTON, OHIO, A CORPORATION OF DELAWARE.

VEHICLE.

Application filed April 15, 1922. Serial No. 553,075.

The present application relates to chassis of motor vehicles and especially to the running gear of such vehicles.

Among the objects of the invention are to lighten such chassis, lessen their cost of production and upkeep, and at the same time provide improved riding qualities and "roadibility".

Another object is the incorporation in such chassis of features permitting the reduction in weight and cost of the bodies to be used upon them.

Further objects and advantages of the present invention will be apparent from the following description, reference being had to the accompanying drawings, wherein a preferred form of embodiment of the present invention is clearly shown.

In the drawings:

Fig. 2 is a side elevation of the chassis illustrated in Fig. 1.

Fig. 3 is a plan view of the right front spring bracket and spring.

Fig. 4 is an elevation of the same showing the spring attachment.

Fig. 5 is a section on line 5—5 of Figs. 3 and 4 through the front axle and front end of one of the springs showing the method of attaching the spring to the axle.

Fig. 6 is a section on line 6—6 of Fig. 4 through the point of attachment at the rear end of the front spring.

Fig. 7 is an elevation of the left front bracket and spring.

Fig. 8 is a detail in elevation showing the mounting of the steering gear on the left front spring bracket.

Fig. 9 is a plan view of the left front spring bracket.

Fig. 10 is a side elevation of the same.

Fig. 11 is a front end elevation of the same.

Fig. 12 is a side elevation of the clamp securing the steering gear to the spring bracket.

Fig. 13 is a plan view of this clamp.

Fig. 14 is a perspective view of the rear end of the chassis showing the rear springs and rear axle in position, certain parts having been omitted for the sake of clearness.

Fig. 15 is a view showing the position assumed by the spring when it drops below its normal position.

Fig. 16 is a view similar to Fig. 15 but showing the position assumed by the spring when raised to the extreme position above its normal position.

Figure 1:
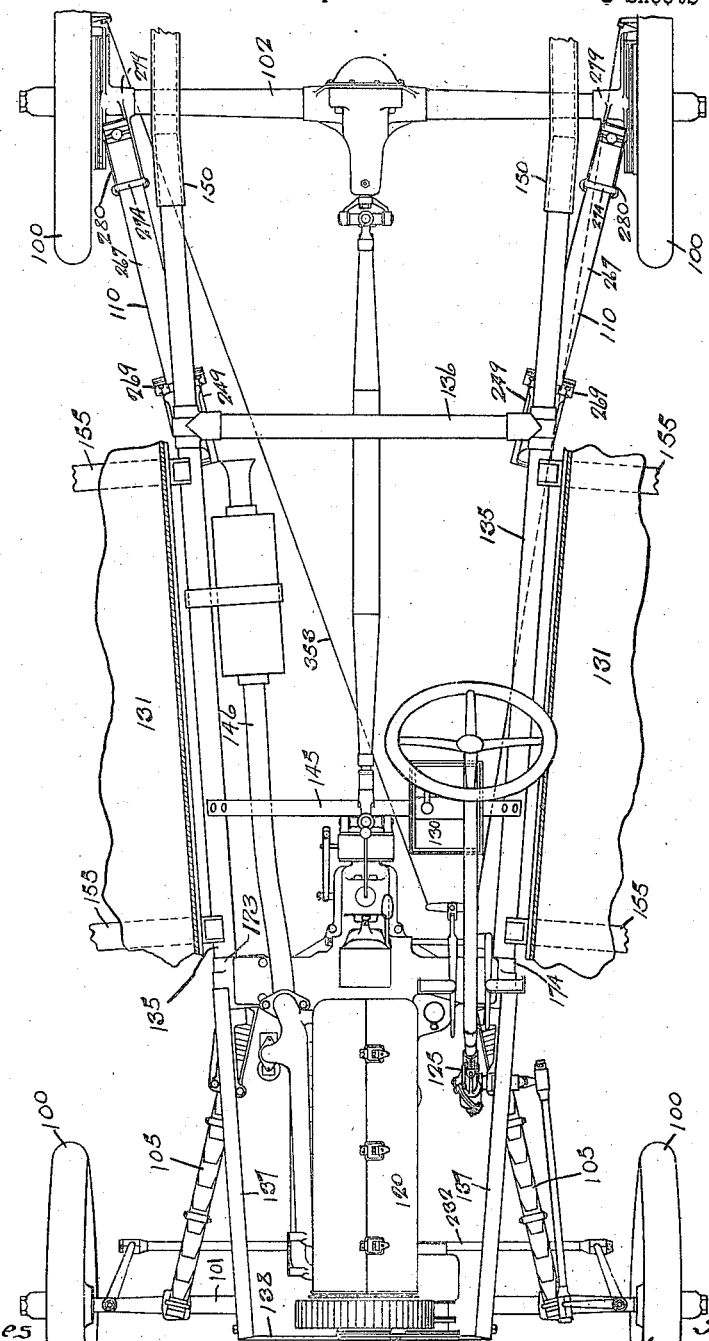
Fig. 1 is a plan view of the chassis.
Figure 18:
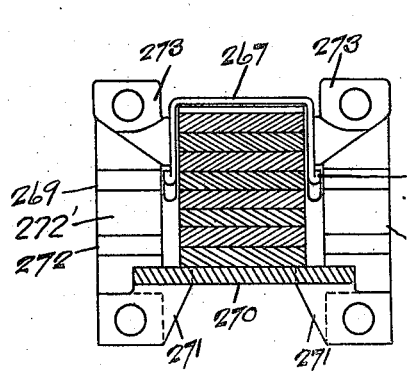
Fig. 18 is a vertical section taken upon a plane indicated by the lines 33—33 Fig. 17.

The chassis comprising the present invention is shown most nearly complete in Figs. 1 and 2.

In these figures the wheels are indicated at 100 mounted upon a front axle 101 and a rear axle 102, the frame being mounted upon the axles 101 and 102 by means of quarter-elliptic springs indicated in Figs. 1 and 2 by the numeral 105 and 110 respectively and to be more particularly hereinafter described.

Mounted upon the frame as described below are the power plant, designated as a whole by the numeral 120, the steering gear, designated as a whole by the numeral 125, the battery 130, the running boards 131 and the gasoline tank and body, the latter two elements not being shown in Figs. 1 and 2.

The power plant consists preferably of a unit plant such as is described in copending application Serial No. 553,938, filed April 17, 1922 in the name of Charles F. Kettering and Charles R. Short. However, for many purposes any suitable power plant including transmission and controls may be used with the present chassis and still be within the scope of the present invention.

Referring now to the frame construction, this consists of, in the present form of construction, two longitudinally extending tubular members 135 extending from a point above the rear axle 102 to the front spring bracket which will be more particularly described later.

These longitudinal members are constructed of steel tubing of suitable size and extend through tubular portions of the rear spring brackets and into suitable tubular portions of the front spring brackets, and the two brackets being rigidly secured upon each tube by welding or other suitable means.

A third steel tube 136 extends across the frame at a point opposite the rear spring brackets and is preferably inserted in a suitable tubular portion of each rear spring bracket as indicated in Fig. 1, and welded or otherwise secured rigidly to these brackets.

The front ends of the tubular members 135 are, as stated above, rigidly secured to the front spring brackets by welding or otherwise and the latter are provided with portions to which the crankcase of the engine forming a portion of the power plant, may be securely bolted and permit the crankcase to take the place of a second cross member for the frame. This arrangement is shown most clearly in Fig. 1.

By this arrangement of tubing and utilizing broad strong feet upon the engine crankcase, it will be seen that the frame with the engine in position constitutes a relatively rigid platform support upon which may be secured the body. Further, on account of the substantial freedom of the frame from twisting, and twisting stresses being resisted by the cross member 136 rigidly secured to the side members and the crankcase bolted to the front spring brackets with a broad supporting surface; much lighter body construction can be used than is the custom. In the ordinary construction, the body must be strong enough to brace the frame.

In order to form a front extension of the frame for the purpose of additionally supporting the front end of the engine, and in order to furnish means for supporting the hood and the front end of the engine cover, sheet metal members 137 are riveted or otherwise secured to the front spring brackets in such manner as to extend forward substantially in line with the tubular members 135 as shown clearly in Fig. 1.

The front ends of members 137 are connected by means of a sheet metal cross member 138 providing support for the front end of the engine crankcase and also providing additional support for the hood structure (not shown).

The frame also includes a cross tie member 143, which member is secured at its ends by being bolted to the under portion of the front spring bracket in the manner indicated in Fig. 2. This cross member serves to tie the frame together at this point when the engine has been removed and adds additional strength and rigidity to the frames.

The frame is also provided with a cross member 145 furnishing means for supporting the muffler pipe 146 and the battery 130 as is most clearly shown in Fig. 1.

As shown in Figs. 3 and 4 the rear ends of tubular members 135 are provided with tubular extensions 150 secured over the ends thereof for the purpose of supporting the fuel tank of the vehicle. These extension members 150 extend to a point in the rear of rear axle 102 and are provided with suitable means for holding the tank in place.

The tubular side members 135 also furnish support for running boards 131 by means of brackets 155 secured to side members 135 in any suitable fashion as by riveting or bolting.

As stated above the spring brackets front and rear furnish not only points of attachment of springs but also furnish points of attachment of the cross member 136 and the crankcase of the engine, which latter acts as a second cross member. The front spring brackets are shown more clearly in Figs. 3, 4, 7 and 8 to 13 inclusive.

On these figures, Figs. 3 and 4 illustrate the right front spring bracket 173 while the other figures mentioned illustrate the left front spring bracket 174. These two brackets are exactly the same except that they are made in rights and lefts and except for the fact that the left spring bracket 174 is provided with means for supporting the steering gear.

The right front spring bracket 173 is as stated above shown most clearly in Figs. 3 and 4 and will be seen to consist of a casting provided with a tubular portion 160 in two sections for the purpose of being able to more securely fasten side member 135 therein, which tubular portion is attached to a web portion 161 extending downward and forward thereof and the latter is provided with transverse webs 162 for the purpose of strengthening the bracket and these cross webs 162 with a portion of the web 161 merge into and brace the upper spring pad 163. Web 161 and a transverse web 162ª merge into and brace the lower spring pad 164. The lower pad 164 extends in a forward direction to a point immediately below the extreme front end of pad 163 and both of these pads are provided with holes for suitable bolts 165 which secure the spring 105 in place. Pad 164 is also provided with a countersunk hole 166 through which extends bolt 167 for the purpose of securing the extreme rear end of the spring to the bracket. The countersunk portion is provided to accommodate a raised boss 168 upon the lower side of the rear end of the lowermost leaf 169 of the spring. This arrangement is shown most clearly in Fig. 6 and the object of the arrangement is to permit the bracket through this countersink and projection to take the end thrust upon the spring.

The spring bracket is also provided at its upper side with a flat sidewise projecting pad 170 furnishing a support for and to which may be secured the engine crankcase as indicated in Fig. 1, the crankcase being secured thereto by suitable bolts projecting through holes 171 provided in this pad 170.

The front springs 105, shown most clearly in Figs. 3, 4 and 7, are identical and are secured to the front axle and to their respective brackets by means which are identical so that only one will be described.

The spring consists of a number of leaves as is indicated in the three figures mentioned, which leaves are secured together in the usual manner by means of U-members 175. The leaves are graduated in length from the bracket forward in the usual manner, and are also graduated in length at the butt end as is indicated in Figs. 4 and 7. The purpose of this graduation or tapering at the butt end is to eliminate useless material thereby reducing the weight of the spring or permitting the use of the same weight of material in a more advantageous manner. The lower leaf 169 of the spring is provided near its ends on its underside with the projection 168 mentioned in connection with Fig. 6 and with another projection 176, shown more clearly in Fig. 5, as its forward end. These projections are intended to be accommodated in suitable depressions such as the countersink 166 in the bracket and a depression 177 in the front axle 101 in order to take care of the end thrust upon the spring, occasioned by the front wheels striking obstructions when the vehicle is in motion. The second leaf 169' is also secured at its rearward end by means of the same bolt that secures the first leaf, as indicated in Figs. 4 and 6 but is shorter at its front end than the first leaf.

The front end of the spring is secured to the front axle 101 by means of U-bolt 178 which extends through suitable holes in the axle, the spring being forced against the axle by means of a small substantially semi-circular block 179 which fits in the curve of the U-bolt and presents its flat face to the spring. This block 179 is provided on its flat side with a cut-away portion so as to hold down the end of the second leaf and yet permit the end of the second leaf to slide thereunder with flexing of the spring.

The only substantial difference between the two front spring brackets lies in the fact that the left bracket (see Figs. 9 to 13) is provided with means for supporting the steering gear 125. In this left bracket the upper spring pad 163 has integral therewith one half of a tubular clamp member 185 for receiving the steering arm housing portion 200 of the steering gear housing. The other half of this clamp is illustrated in Figs. 12 and 13 and consists of a semi-cylindrical portion corresponding to the semi-cylindrical portion integral with the spring bracket and has a boss 188 provided with a bolt hole for attachment to the boss 187 which is also provided with suitable bolt hole and has at its other side a lug or projection 189. The projection 189 is intended to be inserted into the space between the head of one of the bolts 165 and the front of web 190 on the spring bracket as indicated in Fig. 11. Therefore, when the steering gear is in place it is secured by means of a single bolt projecting through lugs 187 and 188. The assembly of the tubular side frame member 135, the left front spring bracket 174, the front extension frame member 137, left front spring 105 and steering gear 125 are shown clearly in perspective in Figs. 1 and 2. It will be noted that the portion of the steering gear housing serving as a bearing for the steering arm projects through the extension member 137.

As described above, the tubular side frame members 135 extend through suitable tubular portions of the rear spring brackets 249 and the latter are securely fastened to the former by welding or otherwise.

These rear spring brackets differ considerably from the front spring brackets but both the right and left brackets are identical but opposite, one of said brackets being shown in Fig. 14, from which it will be noted that the bracket is provided with a T-shaped tubular portion of which the cross arm of the T is indicated at 250 and the stem is indicated at 251.

The side frame member 135 extends through the tubular portion 250 and the cross frame member 136 extends into and is secured in the stem portion of the tubular passage 251, the parts being commonly secured together by welding.

Integral with the tubular portions 250 and 251 is a depending stirrup 255 adapted to receive and support the butt end of the rear spring 110. This stirrup is provided at its front end, that is, the front end of the bracket as positioned on the frame, with a short upwardly projecting web 256 as a reinforcement.

The bracket is also provided with a pad 257 which is seated upon the upper side of spring 110 and which is provided with holes for bolts 258 which secure the spring to the bracket and incidentally against lateral movement of the bracket.

The rear spring is similar in construction to the front spring with the exception that the second longest leaf does not extend so nearly the full length of the longest leaf as is the case with the front spring. Another point of difference is that the U-bolts used to keep the leaves together are not required upon the rear springs by reason of an additional element being used for another purpose but answering the purpose also of the U-bolts 175. Other differences are in the length and flexibility of the front and rear springs.

The rear end of the rear spring 110 is secured to a special form of spring pad 280 integral with a casting forming the end of the rear axle housing. This spring pad is shown in Figs. 14 to 16, and 20 to 21, and will be more particularly described hereinafter.

Figs. 14, 15 and 16 of the lower leaf 265 of the spring is secured to pad 280 by means of a suitable bolt 266 extending therethrough and through the spring pad and secured by means of suitable nuts.

The bolt 266 also serves to hold rigidly to the end of the spring and to the axle, a member 267 which in the form shown is a relatively thin and strong sheet metal channel shaped member extending from the extreme rear end of the spring 110 to a point immediately back of the pad 257 on the spring bracket. This member is preferably of the form shown in Figs. 14 to 16, and has its edges turned back as indicated at 268 for the purpose of increasing the stiffness of the member. This channel member is preferably constructed of a tough alloy steel such as molybdenum steel.

The forward end of member 267 nearest the spring bracket is not attached directly to the spring but is attached through a spring yoke 269, the upper end of the spring yoke 269 being attached to the member 267 and the lower end through plate 270 being bolted to the spring by means of bolts 258 and serving as a cross plate through which bolts 258 secure the spring to spring pad 257.

The plate 270 has attached integral therewith the ears or lugs 271 to which are riveted or otherwise secured springs 272 forming the side members of the yoke 269.

Ears 273 are secured to the channel member 267 by welding or otherwise, and to these latter ears 273 are riveted or otherwise secured the upper ends of springs 272.

Figure 17:
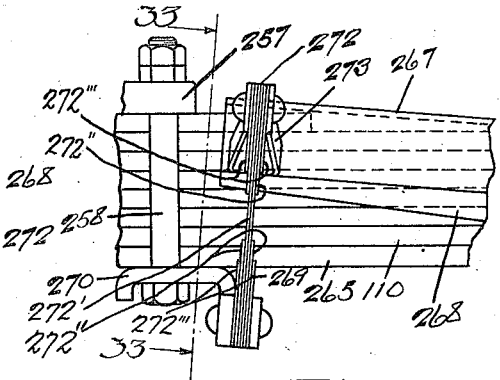
Fig. 17 is an enlarged detail of part of the subject matter shown in Figs. 15 and 16.

Springs 272 are formed preferably, as shown most clearly in Fig. 17, of thin leaves of spring steel, two of which 272′ extend the full length thereof. Upon each side and at each end of these two leaves 272′ are two other shorter leaves 272″ and 272‴, leaves 272″ being somewhat longer than leaves 272‴ and extending from the ends of leaves 272′ to a point short of the middle thereof as in the usual leaf spring construction. The spring 272, therefore, constitutes a small leaf spring arranged to take bending stresses in both directions from normal. These springs 272 permit the endwise motion of channel member 267 at its forward end with respect to the spring 110 and retain the channel member in its proper vertical position relative to spring 110 during movements of the body relative to the rear axle as shown in Figs. 15 and 16 which will be explained latter.

Spring 110 is so formed that in an unstressed condition it has considerable camber or bow therein and in assembling this spring upon spring bracket 249 and spring pad 280, the channel member 267 having attached thereto the spring yokes 269 are first placed over this spring by sliding the spring yoke lengthwise thereover, after which the bolts 258 are placed in position and the spring secured upon the bracket 249. In this position the rearward end of the channel member 267 is elevated several inches above the spring pad 280 and separated from the end of the spring. The channel member and spring are now brought together upon pad 280 and the bolt 266 passed therethrough and secured. The channel member is then secured to the front end of pad 280 by means of U-bolt 274 passing over the member and through suitable holes in spring pad 280.

It will be noted that the assembling of the channel member 267 and spring 110 in this manner will straighten out spring 110 and place an artificial load thereon.

The channel member 267 has other functions which will be referred to later.

Figure 19:
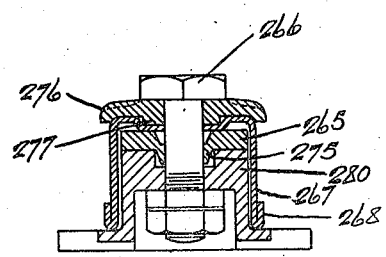
Fig. 19 is an enlarged detail showing the attaching of the rear end of the rear spring to the axle.
Figure 21:
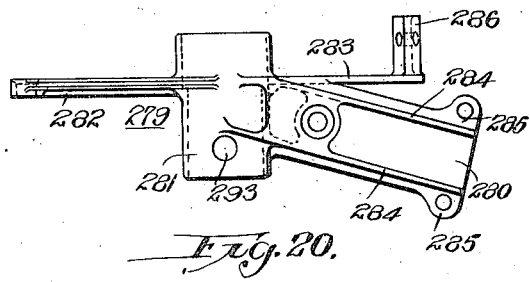
Fig. 21 is a plan view of the same.
Figure 20:
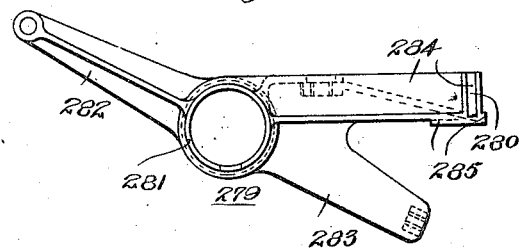
Fig. 20 is a side elevation of the brake supporting member forming one end of the rear axle housing.

Fig. 19 shows a cross section through the spring and spring pad 280, showing clearly the form of spring pad 280 at this point and the method of attaching the spring and channel member thereto. In this figure it will be noted that the spring leaf 265 is provided with a projecting portion 275 extending into a corresponding countersink in spring pad 280. This method of attaching the spring leaf to the axle pad is similar to that described in connection with the front spring and for the same purpose. It will also be noted in connection with this figure that a special form of washer is used upon the upper side of channel member 267. This washer 276 is provided with a projecting portion 277 extending into a corresponding depression in channel member 267. This arrangement is made to take care of any end thrust that there might be upon channel member 267.

As indicated above, the spring pad 280 is formed by a portion of the casting 279 which itself forms a portion of the rear axle housing. This casting 279 is shown in detail in Figs. 20 and 21 and consists of the spring pad 280 integral with a tubular portion 281 into which projects the tube 290 referred to hereinafter as forming a part of the axle housing. Also integral with the tubular portion 281 is a cross arm 282, which arm serves to support the brake described later. The lower and forward end 283 of the cross arm serving to carry the brake band and the upper and rearward end of arm 282 furnishing means to support the brake arm and operating mechanism.

The spring pad 280 is shown most clearly in Figs. 28 and 29 and consists of a member having upstanding flanges 284 and sidewise projecting ears 285. The flanges 284 serve as supports for the spring leaf, and the ears 285, provided with suitable holes, serve as an anchorage for the U-bolt 274. The purpose of the flanges is to support the spring high enough above the base of the pad to allow channel member 267 to extend down over the flanges and provide against lateral movement.

In the chassis as above described there are certain features embodied which should have particular emphasis.

Of these features an important one is the substantial rigidity of the frame. This rigidity is secured in the present construction by the use of the tubular side members 135 and the attachment thereto in as rigid manner as possible the cross member 136 and the engine crankcase, which latter acts as the second rigid cross member. By this construction the frame really becomes a substantially rectangular platform having the spring brackets at its four corners and of very great rigidity. Such a frame permits the use of very light body construction as there is little need of bracing the latter against twisting strains due to weaving of the frame as in ordinary construction.

In the conventional automobile violent bouncing of the rear seat results from the body getting into synchronism with the movements of the tires. In order to avoid synchronism between body frequency and tire-axle frequency it is desirable to get a low body frequency. In the ordinary car this is obtained by a heavy body and long flexible springs, particularly rear springs. A large amplitude for the rear end of the body is the result, and if the ground conditions are right, the body will get into synchronism with the ground with violent rocking at the rear seat.

In the present invention synchronism is avoided and ridability greatly improved by using rear springs which are asynchronous, that is, having no natural period of vibration. The front springs could as well be constructed so as to be asynchronous, but satisfactory results have been obtained by constructing the rear springs only in this manner.

The channel member 267 is in effect a vibration damper in which the point of support of the rear spring on the rear axle spring pad moves nearer to the body, hence shortening the spring, as regards its ability to vibrate, when the deflection of the body increases. Hence the natural period of vibration of the spring is constantly changing as the body moves down.

In Fig. 16, the dotted lines indicate the normal position of the rear spring relative to the frame and axle. The full lines show an upward deflection of the axle but the spring and channel members are in the same position relative to the frame and axle, as if the body had moved downward relative to the axle. Downward deflection of the body, causes the spring pad on the rear axle to be rotated downwardly in a counterclockwise direction as viewed in Fig. 16. If the channel member 267 were not present this rotation of the spring pad would be much greater for the same body deflection as the position of the spring pad would be determined by the natural curve of the spring corresponding to this body deflection. The channel member operates to resist this turning of the spring pad counterclockwise as the body moves down relative to the axle. The greater the deflection, the greater the resistance offered by the channel member to the rotation of the spring pad, hence the greater the force applied by the channel member tending to stiffen the spring. It is therefore apparent that the stiffness of the rear spring varies with the downward deflection of the body. Instead of being a normal spring in which the deflection varies in direct and constant proportion to the load, the ratio of deflection increment to load increment is decreasing as the load increases. This amounts to the same thing as making the spring shorter and consequently more stiff, as the deflection of the body below normal increases. Therefore the spring can have no natural vibration period, because for every new position of the body with relation to the rear axle there will be a different length of spring. The spring becomes shorter so to speak, when contemplating its vibration period, as the body goes down.

Another way of looking at the function of the channel member is this: As the body goes down, the spring is bent with respect to the rear axle and the spring pad is rotated about the axle through a certain angle depending on the amount of body deflection. The angular movement of the spring pad will cause the channel to rotate since the channel is fixed to the spring pad. As the free end of the channel (meaning when the arm is tied down to the spring bracket on the frame) moves down the force which tends to rotate the axle as the body moves downward will be distributed more and more at the free end of the channel and less at the fixed end. The effect is that the point of application of the resultant of these two forces is moving up toward the body as the deflection increases. In considering the vibration of the body and spring it is as though one shifted the center of oscillation of the spring toward the body as the body moves down. This produces what is known as an acyclic condition in which there is no fixed cycle of vibration. The vibration cycle or period of the body is changing (increasing) as the body is deflected below normal. It is as though one could move the axle toward the body as the body goes down and vice versa. As the body rises above the normal position, the spring will strike the channel member throughout its full length, hence any tendency of the spring to go into a frequency is immediately damped. Upon rebound of the body due to the reverse flexing of the spring, the channel member also has a snubbing effect in that it presses the spring leaves together and further retards the longitudinal movement of the leaves upon each other by virtue of the fact that the free ends of the leaves contact with the upper internal face of the channel, rubbing thereagainst. In performing this function the channel member may be considered as a continuous spring clip tending to keep all the spring leaves together while permitting the leaves to slide on one another. Therefore any tendency of the body to vibrate naturally except through a very small amplitude is immediately damped.

This natural period which exists through a small amplitude is called the normal load period. In the conventional automobile the periodicity of the rear springs varies with the load, and particularly with the number of passengers in the rear seat. But in the present invention whatever natural period of the rear spring may be within a small amplitude, this period is substantially constant for varying body load. As the load increases the stiffness of the spring also increases, and these variables can be so proportioned that the normal load period will remain constant. Therefore the damping action of the channel member will be just as effective with the rear seat empty as full.

The normal load periodicity is low relative to the axle-tire periodicity, hence synchronism between the spring and unsprung portions of the vehicle is avoided.

Since the rear springs are practically asynchronous, synchronism between the vibration of the front and rear springs is avoided, hence teetering or bucking of the vehicle is eliminated.

Since the rear springs are practically asynchronous, synchronism between rear springs and bumps in the road is avoided. Whenever the rear springs tend to go into vibration following striking a bump, this tendency is immediately checked, hence there can be no cumulative effects between spring vibrations and movements of the rear axle due to road bumps.

The channel member 267 functions also as a device for preloading the rear spring. The rear spring in its unstressed condition has considerable camber or bow, and the act of clamping the rear spring and member 267 down on the rear axle spring pad causes the spring to be nearly straight. This is the normal load condition of the spring, therefore when the spring is receiving the normal load from the body without carrying a useful or live load, the member 267 is in a practically unstressed condition. If the channel member 267 were not used, the spring would need to be much stiffer and heavier in order that the range of deflection would be restricted to suitable limits. The channel member permits the use of a much lighter and more flexible spring, since the channel member operates to stiffen the spring and therefore to restrict its range of deflection. The rear spring is one which yields readily to road shocks and is therefore an easy riding spring. The rear spring may yield readily without being affected by the channel member unless the deflection exceeds a certain amplitude whereupon the channel member not only dampens vibration but operates to stiffen the rear spring and therefore to restrict its range of movement. The rear spring is therefore easy riding besides being practically asynchronous.

The channel member 267 is also a torque member for transferring torque from the rear axle to the frame. Any tendency of the member 267 to rotate clockwise about the rear axle is resisted by the flexible yoke connection with the rear spring bracket.

The channel member operates to protect the rear spring in a large measure from dirt, thereby facilitaing keeping the springs clean and in condition so that lubricant will be readily soaked up between the spring leaves.

The channel member acts also to brace the spring against side thrusts, such as resulting from skidding and action of centrifugal force.

The type of rear spring employed in the present invention permits the use of a rear spring much shorter than the conventional type having the same yieldability. With the use of short rear springs, it is possible to fabricate the frame of tubular members. Such members are excellent as torsion members but not so good as some other sections as channels and I beams to take bending about a horizontal axis. Since the rear springs are short the rear spring brackets can be kept well to the rear, hence the bending moments about these brackets due to body loads can be kept low enough to permit the use of tubular members economically. The diverging of the springs assists in permitting the use of tubular members since the bending moments will be less for a given spring length and wheel base than when the springs are entirely under the side frame members or parallel therewith. The twisting moments will be increased but this does not subtract from the capacity of the tubular members to resist bending.

It is desirable to use a tubular rear cross member since the twisting moment in this member is high, the front end of one side member is raised above the other.

On account of the rigid attachment of the rear springs to rear axle and the rigidity of the frame, if a rear spring bracket breaks and frees the front end of spring this will not drop down and stick in the road and push the axle from under the car or lift up the corner of the car and cause damage.

While the forms of mechanisms herein shown and described constitute a preferred form of embodiment of the present invention, it is to be understood that other forms might be adopted, all coming within the scope of the claims which follow.

What we claim is as follows:

1. In spring suspension means for motor driven vehicles and in combination with a tubular side frame member, a spring supporting bracket secured to said frame member and having a tubular portion into which said member extends; said bracket having upper and lower spring pads spaced apart from one another, and a vertically arranged web connecting said pads; a spring one end of which is disposed between said pads, and the other end of which is fastened to an axle of the vehicle; bolts adapted to clamp the first mentioned end of the spring between said pads; and a bolt adapted to secure the extremity of the spring to the lower one of said spring pads.

2. In spring suspension means for motor driven vehicles and in combination with a tubular side frame member, a spring supporting bracket secured to said frame member and having a tubular portion into which said member extends; said bracket having a laterally extending supporting portion, upper and lower spring pads spaced apart from one another, and a vertically arranged web connecting said pads; a spring one end of which is disposed between said pads, and the other end of which is fastened to an axle of the vehicle; bolts adapted to clamp the first mentioned end of the spring between said pads; and a bolt adapted to secure the extremity of the spring to the lower one of said spring pads.

3. In spring suspension means for motor driven vehicles and in combination with a tubular side frame member, a spring supporting bracket secured to said frame member and having a tubular portion into which said frame member extends; said bracket having upper and lower spring pads spaced apart from one another, and a vertically arranged web connecting said pads; a spring one end of which is disposed between said pads, and the other end of which is fastened to an axle of the vehicle; bolts adapted to clamp the first mentioned end of the spring between said pads; a bolt adapted to secure the extremity of the spring to the lower one of said spring pads; and means carried by said bracket for supporting an element of the vehicle other than the spring aforesaid.

4. In spring suspension means for motor driven vehicles and in combination with a side frame member, a spring supporting bracket secured to said frame member; means for fastening the forward end of a spring to said bracket; a spring pad carried by the rear axle of the vehicle and to which the rear end of the spring is fastened; a torque arm extending along the spring, and the rear end of which is rigidly secured to said spring pad; and means carried by said bracket for preventing angular movement of the front end of said arm while permitting movement of said front end longitudinally of the spring.

5. In spring suspension means for motor driven vehicles and in combination with a side frame member, a spring supporting bracket secured to said frame member; means for fastening the forward end of a spring to said bracket; a spring pad carried by the rear axle of the vehicle and to which the rear end of the spring is fastened; a torque arm overlying and extending along the spring, and the rear end of which is rigidly secured to said spring pad; and a flat vertically arranged spring member the lower end of which is fastened to said bracket, and to the upper end of which the front end of said arm is fastened, to thereby permit limited movement of said front end longitudinally of the spring and to prevent angular movement of said front end.

6. In spring suspension means for motor driven vehicles and in combination with a side frame member, a spring supporting bracket secured to said frame member; means for fastening the forward end of a spring to said bracket; a spring pad carried by the rear axle of the vehicle and to which the rear end of the spring is fastened; a torque arm U-shaped in cross section extending along the upper side of said spring, and the rear end of which is rigidly secured to said spring pad; and a vertically arranged spring yoke straddling the front end of said arm and the lower end of which is fastened to said bracket, and to the upper end of which yoke the front end of said arm is fastened, to thereby permit limited movement of said front end longitudinally of the spring and to prevent angular movement of said front end.

7. In spring suspension means for motor driven vehicles and in combination with a side frame member, a spring supporting bracket secured to said frame member; means for fastening the front end of a spring to said bracket; a spring pad carried by the rear axle of the vehicle and having a forwardly extending portion, and to which pad the rear end of the spring is fastened;

a torque arm U-shaped in cross section overlying and extending along the spring, and the rear end of which encloses the upper side of the extension of said spring pad; means for rigidly securing the rear end of said torque arm to said spring pad; a U-shaped clip engaging the rear portion of said torque arm and the forwardly extending portion of said spring pad and whereby said members are fastened together; and vertically arranged spring members one upon each side of said torque arm; the lower ends of said members being fastened to said bracket, and the upper ends thereof being fastened to the front end of said torque arm, to thereby permit limited movement of said front end longitudinally of the spring and to prevent angular movement of said front end.

8. In spring suspension means for motor driven vehicles and in combination with a side frame member, a spring supporting bracket secured to said frame member, said bracket having upper and lower spring pads spaced apart from one another, and a vertically arranged web connecting said pads; a spring one end of which is disposed between said pads, and the other end of which is fastened to an axle of the vehicle; means adapted to clamp the first mentioned end of said spring between said pad; means adapted to secure the extremity of the spring to the lower one of said pads; and means carried by said bracket for supporting an element of the vehicle other than the spring aforesaid.

In testimony whereof we hereto affix our signatures.

CHARLES F. KETTERING.
CHARLES R. SHORT.